Nov. 20, 1956 W. H. CLARK, JR 2,771,286
SPEED CONTROL MECHANISM
Filed Jan 19, 1953 3 Sheets-Sheet 1

INVENTOR.
WILLIAM H. CLARK JR.
BY Godfrey B. Speir
ATTORNEY

Nov. 20, 1956 W. H. CLARK, JR 2,771,286
SPEED CONTROL MECHANISM
Filed Jan. 19, 1953 3 Sheets-Sheet 2

INVENTOR.
WILLIAM H. CLARK JR.
BY Godfrey O. Speir
ATTORNEY

Nov. 20, 1956  W. H. CLARK, JR  2,771,286
SPEED CONTROL MECHANISM
Filed Jan. 19, 1953  3 Sheets-Sheet 3

INVENTOR.
WILLIAM H. CLARK JR.
BY Godfrey B. Spein
ATTORNEY

United States Patent Office 2,771,286
Patented Nov. 20, 1956

2,771,286

SPEED CONTROL MECHANISM

William H. Clark, Jr., Rutherford, N. J., assignor to Curtiss-Wright Corporation, a corporation of Delaware Application January 19, 1953, Serial No. 331,990

7 Claims. (Cl. 264—5)

This invention relates to acceleration stabilized anticipatory speed control or governing mechanisms of general application, and also to such mechanisms as are particularly suitable for the control of gas turbine-propeller power plant combinations as used in aircraft.

The invention comprises improvements over those disclosed in Robbins Patent #2,667,344, granted January 26, 1954 and over Mergen, et al. Patent #2,720,927 granted October 8, 1955. The Robbins patent shows a mechanical system for comparing the speeds of a prime mover and of a reference speed device from which is secured a speed error signal. The patent further provides mechanical devices for ascertaining the rate of change of speed error, and for adding, algebraically, the speed error and the rate of change of speed error, productive of a speed correcting signal utilized for controlling the speed of the prime mover. The speed control thus includes speed error and acceleration stabilization. The Mergen et al. patent shows a somewhat similar arrangement to which has been added an alternative means for securing reference speed. One or the other sources of reference speed may be utilized, one of these devices being considered as a standby speed reference useable upon failure of the primary speed reference.

In both of the foregoing systems, the stabilizing signal is secured from the speed reference and for an installation which is intended at all times to run at the same constant speed, both systems afford excellent control. Where the power plant is expected to operate at different speeds, the speed reference must be variable during operation. In this case, it is necessary to insert delay mechanisms to prevent overspeeding or underspeeding, to delay the response of the system when adjustments are made in the power level of either one of the reference speed devices. In other words, the speed setting delay mechanism is necessary in the above mentioned control arrangements to cause the speed setting to lag the power plant speed during a power change wherein there is a simultaneous change in the speed level at which the power plant is to operate and in the level of power to be delivered by the power plant, usually secured by a change in the amount of fuel flow to the power plant. If the change of speed setting were not delayed during a call for increase in speed and power, the system calls for (1) an initial reduction in power plant load due to the speed error when the power plant speed is less than the called for speed, and (2) a decrease in power plant load as a result of the acceleration stabilization. The decrease in power plant load at this time is not wanted; rather, an increase in power plant load is needed to absorb the increase in power available and to prevent overspeeding of the power plant.

The above indicated delay in speed change slows down the response of the system when speed and load changes on the power plant are demanded.

If the signal for acceleration stabilization is made independent of speed change demands from the governor system, the above mentioned difficulty may be overcome. This may be accomplished by providing a speed reference which is constant at all times, and which is independent of the power plant speed control, and which is used to derive an acceleration stabilizing signal. This latter signal may then be combined with the speed error signal, the final signal being used to control power plant speed. With such an arrangement, the acceleration stabilizing part of the system ignores a call for a changed level of power plant speed and, upon a change in power plant speed will immediately call for a change in power plant load. For instance, the stabilizing system will call for an increase in power plant load with a call for increase in power plant speed while, at the same time, the speed error part of the system will call for a decrease in power plant load when the call is made for increased power plant speed. The acceleration signal will overcome the speed error signal and will result in increased engine load if the acceleration signal strength is high with respect to the speed error signal strength.

The changes required in the systems shown in the previously mentioned pending applications are not particularly great in order to achieve improved performance in a changeable speed power plant.

Reference may be made to the drawings for a better understanding of the character of the invention. In the drawings, similar reference characters indicate similar parts and:

Figure 1:
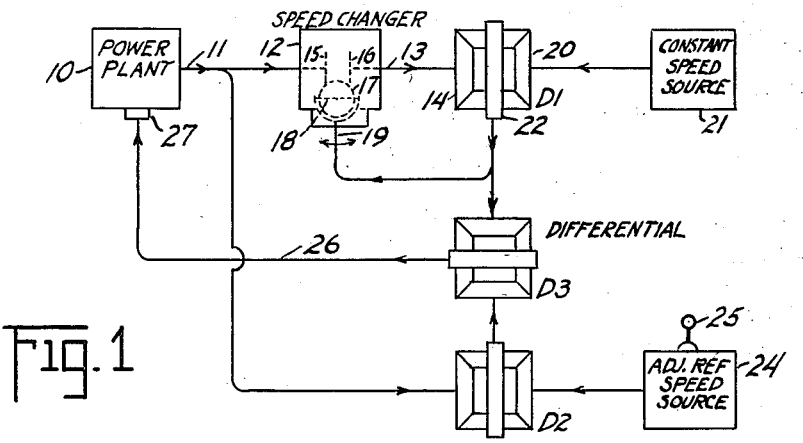
Fig. 1 is a diagram of the general case for accomplishing the objects of the invention.

Reference may first be made to Fig. 1 which shows the general case for acceleration stabilization of the system using a constant speed source and wherein power plant speed is compared with a reference speed derived from a reference speed source. Herein, a power plant 10 is provided with an auxiliary output shaft 11 which drives a speed changer 12. The speed changer, which may be of any suitable type, has an output shaft 13 driving a gear 14 of a differential D1. As shown schematically, the speed changer may comprise an input disk 15 and an output disk 16 spaced therefrom, the disks being frictionally engaged by a planet ball 17 whose axis of rotation 18 may be shifted by a tilting control element 19. This is the same type of speed changer as is shown in Mergen et al. patent above mentioned.

Another side gear 20 of differential D1 is driven in opposite direction to gear 14 from any appropriate device 21 which operates at a fixed constant speed. The output spider 22 of differential D1 will rotate at a speed representing the difference between the speed of the shaft 13 and the constant speed. The output 22 of the differential D1 is drivably connected to the ratio changer 19 of the speed changer 12 in a manner so that the speed changer ratio is shifted to stop movement of the output 22 of the differential D1. For any power plant speed there is a corresponding ratio of such speed to the constant speed, and hence, there is a particular setting for the speed changer 12 to stop movement of the differential output 22. Thus, said output assumes the position which represents ratio of power plant speed to constant speed and also the power plant speed itself, since the constant speed does not vary. The speed and movement of output 22, then, represents the rate of change of power plant speed and constitutes an acceleration signal which is carried to an input gear of a differential D3.

The power plant 10 is also drivably connected to an input gear of a differential D2, the other input gear of which is driven in opposite direction by an adjustable reference speed device 24 whose speed may be regulated by a control 25. The device 24 is chosen so that it will operate at a selected constant speed within a desired speed range, the speed selection being made to control the desired speed of the power plant. The output of differential D2, which represents the speed error between the power plant 10 and the reference speed source 24, is drivably connected to the other input gear of differential D3. The differential D3 algebraically sums the acceleration signal from differential D1 and the speed error signal from differential D2 so that he output of differential D3 attains a position which calls for the speed correction required. The output of differential D3 is connected at 26 to a speed regulator 27 of the power plant 10.

When this system is applied to an aircraft power plant driving a controllable pitch propeller, speed control of the power plant is afforded by alteration of propeller pitch. This is the same thing as alteration of the driven load on the power plant and its purpose is to adjust the driven load so that it will absorb the power available from the power plant. The position of the element 26, the output of the differential D3, calls for the specific blade angle which is required to hold the power plant speed at the level called for by the adjustable reference speed, and at the power for which the power plant is set to operate. The ratios of driving connections in the control are selected to provide optimum performance.

The differentials D1, D2 and D3 in Fig. 1 and also in other figures of the drawing have been conventionalized for simplification in the showing. In each showing of the differential, the member corresponding to 22 in D1 is the output member and is represented by a bar across the differential. This member is usually the spider which carries pinions meshing with the facing gears such as 14 and 20 of D1.

The driving connections between the elements in the figures are shown in single solid lines, the direction of power transmission being indicated by arrows. The actual driving connections in a working embodiment of the invention may be of any preferred type, such as shafting, gearing, or other mechanical, hydraulic, electrical, or combined transmission means.

In Figs. 2–7, speed changers are identified as blocks containing the initials "SC." All such speed changers may be of the form schematically shown in Fig. 1 or may be of alternative design as known in the art.

In all of the figures, the differentials D1, D2, and D3, and the speed changer 12, have the same relationship and serve the same joint function.

To visualize the functioning of the invention, the ensuing explanations may be followed. In a first case, let it be assumed that the constant speed source 21 and the adjustable speed source 24 are in operation at different speeds and that the power plant is operating at a set power level and at a speed which is the same as the speed of the source 24. This, of course, represents an on-speed condition wherein no speed correction is being made. The output of the differential D1 will be zero and the speed changer 12 will be adjusted to a ratio such that the speed changer output in R. P. M. is the same, but in opposite direction, to the output of the constant speed source 21. Since power plant speed and reference speed are the same, and in opposite direction, the output of the differential D2 is zero.

Now, should there be a transient disturbance in power plant speed whereby its R. P. M., let us say, increases, a speed error will be sensed by differential D2 and a corrective signal will be passed to the differential D3, calling for increased driven load on the power plant. For this example we will assume that the power plant drives a controllable pitch propeller and consequently, the differential D3 will call for an increased propeller blade angle to bring the R. P. M. back to normal. Concurrently the differential D1 will register the initial acceleration of the power plant toward the increased speed to cause movement of the output of differential D1, simultaneously shifting the speed changer to bring the differential output to zero and passing the acceleration signal to differential D3. This signal will initially be a positive acceleration signal during the transient increase in power plant speed and will call for increased propeller pitch. As speed is corrected and the power plant decelerates, the sign of the acceleration correction will change to negative, the deceleration signal being minus with respect to the speed error signal and offsetting at least in part the speed error signal which is plus. As the speed error decreases due to approach of the power plant to the on-speed condition the acceleration and speed error signals will equalize and blade pitch correction will cease and probably reverse direction before the power plant reaches on-speed. The blade angle setting due to this action will probably overshoot that which is required to maintain the reference R. P. M. but will quickly return to the required pitch. Thereby the excess load torque during the pitch overshoot decelerates the power plant rapidly toward the reference speed. The reverse of pitch change before the power plant reaches on-speed allows the blade angle to return to the final setting at substantially the same time as the power plant reaches on-speed. This action prevents hunting as the final speed is reached. The acceleration signal provides anticipatory control to expedite the attainment of on-speed without hunting.

If the transient speed error is in the opposite direction, that is, a decrease in speed, the same action as above described will occur except in reverse directions.

If the power plant is operating at a steady state condition and an increase is made in the reference speed by adjustment of the speed source 24, without any concurrent change in the fuel setting of the power plant, an underspeed error will be registered by the differential D2 which is transmitted to the differential D3 to cause a correction in power plant speed by decreasing load or blade angle. The acceleration signal from differential D1 does not appear until an actual change in power plant speed is accomplished whereupon the positive acceleration and minus speed error signals are summed in the differential D3 to correct the blade pitch setting in the same manner as described above.

It will be here noted that no change is made in the constant speed source 21.

If the constant speed source were replaced by the reference speed source, a change in speed setting would produce an acceleration error of minus sign immediately the reference speed setting is changed. This would call for decreased blade angle along with the call for decreased blade angle made by the speed error until such time as the power plant accelerates positively. Thereupon, the sign of the acceleration error will change to plus, in opposition to the signal due to speed error, and the steady state condition will be attained as described previously. Then, pitch change will cease and the power plant will reach on-speed without further pitch change or load correction.

If the power plant is operating at a steady state condition and a decrease in reference speed is made by adjustment of the speed source 24, with no concurrent change in fuel setting of the power plant, the blade pitch angle will be increased by the speed error in differential D2 and negative acceleration will anticipate the speed correction through its transmission from the differential D1 to the differential D3.

If the adjustable reference speed is changed concurrently with a change in power setting for the power plant, let us say in a power and speed increasing direction, the differential D2 will register an underspeed error calling for decreased blade pitch to enable the power plant to gain speed. However, since power is being increased along with speed, it is necessary to increase rather than decrease blade pitch so that the propeller may absorb the additional power available from the power plant. As the power plant responds to the increase in fuel feed it will accelerate thus producing a positive acceleration signal in the differential D1 which is transmitted to the differential D3 in a direction to call for increase blade pitch. The gearing of the several differentials is so arranged that this signal will be stronger than and will overcome the negative speed error signal from the differential D2 so that increased blade pitch will actually be called for in the controllable pitch propeller to absorb the increased power.

Since the desired speed lever has also been raised, the signals from the differentials D1 and D2 will combine in the differential D3 to call for the blade angle for the power plant which will produce stable power plant operation at the new speed and power setting.

If power and speed are concurrently decreased, the opposite effects from those above described will be secured so that propeller blade angle will end up at the proper value to maintain the new speed setting for the power being developed by the power plant.

If the constant speed source 21 were replaced by the adjustable reference speed, as in the disclosure in Mergen et al. patent it becomes necessary to insert a delay device such as a dashpot between the speed reference and the differentials to avoid a tendency toward overspeeding in the case of a change in power and speed.

If this delay device were not use, a call for increased speed and power would result in a negative speed error calling for decreased blade angle and would also call for a decreased blade angle due to negative acceleration at the start of the cycle. This would permit overspeeding even though the last part of this cycle, after the power plant begins to accelerate, would call for an increase in blade angle due to the positive acceleration. The power plant would overspeed and speed correction would then be accomplished by increasing blade angle in the manner previously described. When the delay device is inserted in the Mergen et al. system, the increase in power and called for speed creates positive acceleration and a call for a positive speed error so that blade pitch is increased immediately. However, the insertion of the delay device while making the system fully satisfactory from an operative standpoint, injects added complications and variables.

Thus, it will be appreciated that a principal object of the present invention is to provide a simple derivative speed control system which depends upon operating conditions and eliminates arbitrary delay factors which are necessary in the device of the prior art.

For clarification of the foregoing explanation, a tabulation follows which shows the direction of change of blade angle, called beta ($\beta$) for various operating changes.

| Control conditions of power plant | Sign of speed error | Effect of speed error on blade angle $\beta$ | Sign of acceleration | Effect of acceleration on blade angle $\beta$ | Net effect on blade angle $\beta$ |
|---|---|---|---|---|---|
| Transient underspeed fixed power | − | Less | (1) −<br>(2) + | Less<br>Anticipates new setting of $\beta$ | Less $\beta$. |
| Transient overspeed fixed power | + | Greater | (1) +<br>(2) − | Greater<br>Anticipates new setting of $\beta$ | Greater $\beta$. |
| Increased speed setting fixed power setting | − | Less | + | Anticipates new setting of $\beta$ | Less $\beta$. |
| Decreased speed setting fixed power setting | + | Greater | − | do | Greater $\beta$. |
| Increased speed and power setting | − | Less | + | Initiates greater $\beta$ | Starts correction to prevent overspeed and stabilizes at required new $\beta$. |
| Decreased speed and power setting | + | Greater | − | Initiates less $\beta$ | Starts correction to prevent underspeed and stabilizes at required new $\beta$. |
| Increased power setting fixed speed setting | + | Increases | (1) +<br>(2) − | Increases $\beta$<br>Anticipates new setting of $\beta$ | Corrects to new $\beta$ to absorb power. |
| Decreased power setting fixed speed setting | − | Decreases | (1) −<br>(2) + | Decreases $\beta$<br>Anticipates new setting of $\beta$ | Do. |

Figure 2:
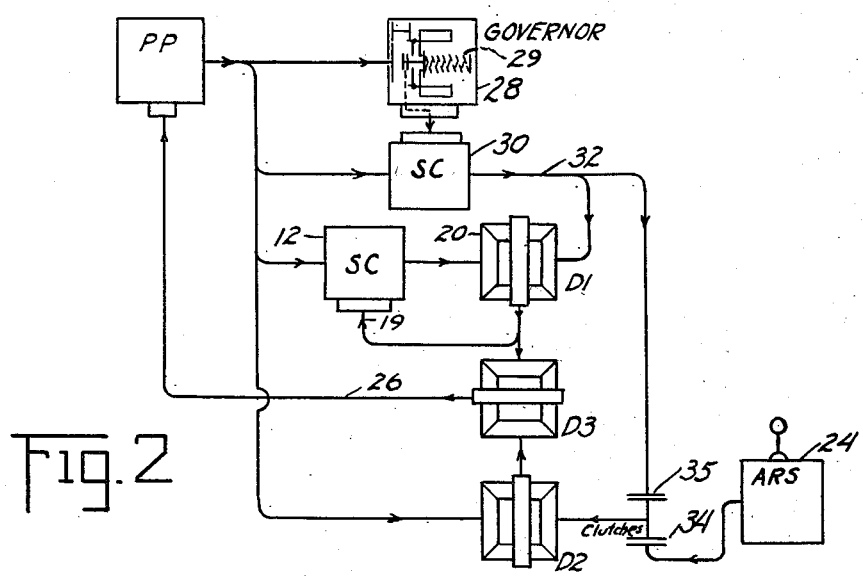
Fig. 2 is a diagram of the invention wherein the constant speed source for acceleration stabilization is derived from the variable power plant speed and wherein the reference speed is derived alternatively from an adjustable device or from the governed constant speed.

There are various means by which these results may be accomplished practically, which are shown in Figs. 2–6. Fig. 2 shows in effect, a modification of the system of said Mergen et al. application. In Fig. 2, a governor 28 is driven by the power plant and strokes the ratio changer of a speed changer 30 which is also driven by the power plant. The governor has a non-adjustable speeder spring 29 so that the output 32 of the speed changer 30 is always maintained at a constant speed. This output 32 provides the input to the right side of the differential D1 so that the system then operates in the same fashion as the system shown in Fig. 1. In this case, the adjustable speed reference source 24 is connected to the differential D2 through a clutch 34 and when so connected this system operates as does the system of Fig. 1. In case of failure or disconnection of the reference speed source (ARS) 24 from the system, the drive to differential D2 may be arranged to disconnect automatically from the reference speed source, and to connect to the constant speed output 32 of the speed changer 30 through a clutch 35, as in said Mergen application. This enables standby operation of the system at the constant speed for which the governor 28 is set. A limitation in this type of standby system is that when it is operating under emergency conditions there is no speed flexibility for the power plant. Under certain circumstances, this is not a significant limitation. The clutch 34 becomes unnecessary if the reference speed source is a motor which rotates freely when electrically disconnected from its power supply.

The system of Fig. 2 may be applied with very little change to the system disclosed in the Mergen et al. patent without the addition of any speed changer or differential units and enables the elimination of the speed changer delay device heretofore mentioned along with more rapid response of the power plant to speed and power changes than can be attained with the system disclosed in the Mergen et al. patent.

Figure 3:
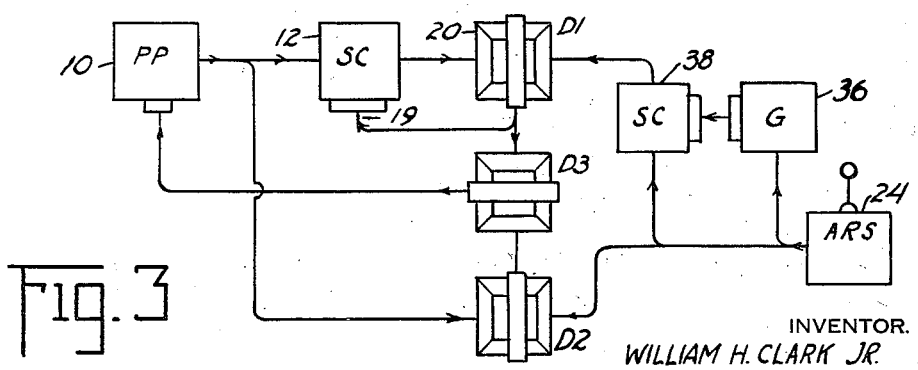
Fig. 3 is a diagram of the invention wherein both the constant speed for acceleration stabilization and the reference speed are derived from a separate reference speed source.

Another alternative arrangement is shown in Fig. 3 wherein the constant speed for acceleration stabilization as delivered to the differential D1 is derived from the adjustable reference speed source 24. In this case as in Fig. 1, the adjustable reference speed source is directly connected to the differential D2. The device 24 also drives a governor 36 having a fixed speed setting, this governor serving to control a speed changer 38 which is driven by the adjustable reference speed source 24. The output of the speed changer 38 will run at constant speed as controlled by governor 36 to provide a constant speed input to the right side of differential D1. This system would be satisfactory if a completely dependable and continuously operating reference speed source 24 is available.

Figure 4:
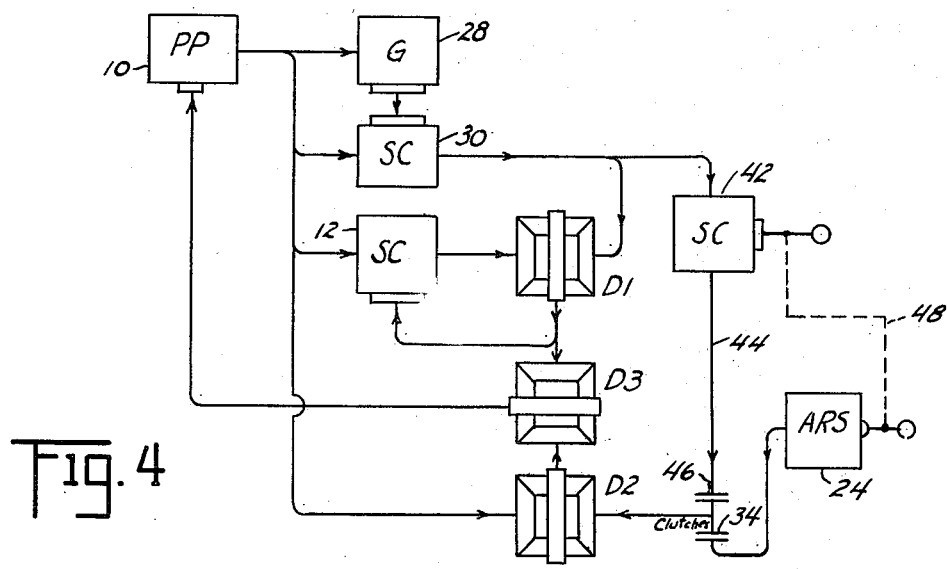
Fig. 4 is a diagram of the invention wherein the constant speed for acceleration stabilization is derived from the power plant and where reference speed is alternatively derived from the power plant or from a reference device.

In the arrangement of Fig. 4 the power plant drives a fixed-setting governor 28 and a speed changer 30, the governor controlling the speed changer. The output of the speed changer 30 operates at constant speed and drives the right hand input gear of the differential D1 to provide the desired operating characteristics for the acceleration responsive part of the system, as in Fig. 2. The adjustable reference speed source 24 may normally be connected to drive the differential D2 through a clutch 34.

An additional speed changer 42 is provided, driven at constant speed by the speed changer 30. The speed changer 42 is selectively adjusted to a ratio so that its output provides a reference speed of desired value connectable at times or as desired to the differential D2 through the driving connection 44 and clutch 46. The clutches 46 and 34 operate reciprocally and preferably in response to failure or stoppage of the device 24, so that if the latter, which is normally connected to the differential D2, fails, the system is immediately connected to the speed changer 42. Preferably, the speed control for the device 24 and for the speed changer 42 are interconnected by a suitable linkage 48 so that the speed changer 42 and the device 24 will both normally call for the same reference speed.

The reference speed source 24 may be part of synchronizing gear for a plurality of power plants whereby the reference speed from speed changer 42 may be used for standby purposes. Alternatively, for a single power plant system, the changer 42 may drive differential D2 directly, omitting the elements 24, 46 and 34.

Figure 5:
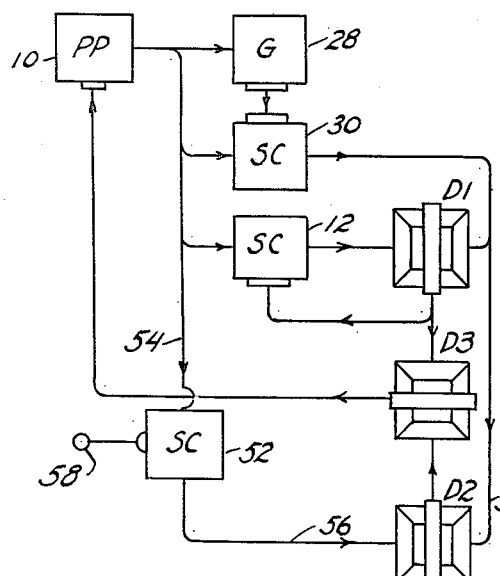
Fig. 5 is a diagram of the invention wherein the constant speed is derived from the power plant and wherein the reference speed is also derived from the power plant.

Fig. 5 shows a variation in the system wherein a fixed setting governor 28 is driven by the power plant 10 and controls the speed changer 30 also driven by the power plant 10. The speed changer 30 drives the right side of differential D1 as previously and the left side of D1 is driven through a speed changer 12 from the power plant. This provides the same acceleration responsive control as previously described. The right side of differential D2 is also driven from the speed changer 30 through a driving connection 50 so that the right end of the differential D2 rotates at a fixed constant speed. The power plant also drives a speed changer 52 through a driving connection 54, the output from the speed changer 52 driving the left end of differential D2 through a driving connection 56. The differentials D2 and D1 are connected into the differential D3, and the output of differential D3 controls power plant driven load as previously described.

The speed changer 52 is manually controllable by an adjuster 58 so that its ratio may selectively be made greater or less than 1. The adjuster 58 thus establishes a relationship between power plant speed and a fixed constant speed established by the speed changer 30. For instance, if the fixed constant speed is 10,000 R. P. M., a ratio of 1:1 in the speed changer 52 would require the power plant to operate at 10,000 R. P. M. and any deviations from this speed would actuate the control system to correct power plant driven load to restore the 10,000 R. P. M. operating speed. If it were desired to operate the power plant at 11,000 R. P. M. the speed changer would be set at a ratio of 1.1:1.0. Any deviation from the arbitrary 10,000 R. P. M. in the driving connection 56 would register a speed error and would correct power plant speed to a level such that the driving connection 56 is at 10,000 R. P. M. This necessarily means that the power plant would have to operate at 11,000 R. P. M. to yield 10,000 R. P. M. in the driving connection 56. In the same fashion, if the speed changer were set to a ratio of 0.9:1.0 the power plant would be on-speed at 9,000 R. P. M. and would thereby produce 10,000 R. P. M. in the driving connection 56 to match the 10,000 R. P. M. output speed of the speed changer 30. Any other ratio setting will produce analogous effects and, of course, the fixed constant speed at the output of the speed changer 30 may be designed for any desired value.

In Fig. 5, the operation of the control system in respect to speed error and acceleration error is the same as that previously described.

Figure 6:
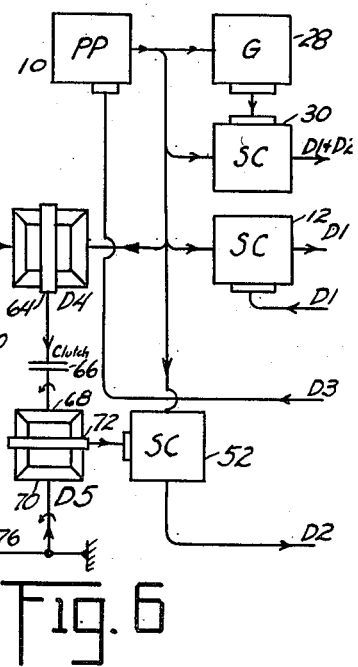
Fig. 6 is a partial diagram of the invention, adapted for synchronization of a plurality of power plants, following the principles of Fig. 5.
Figure 6A:
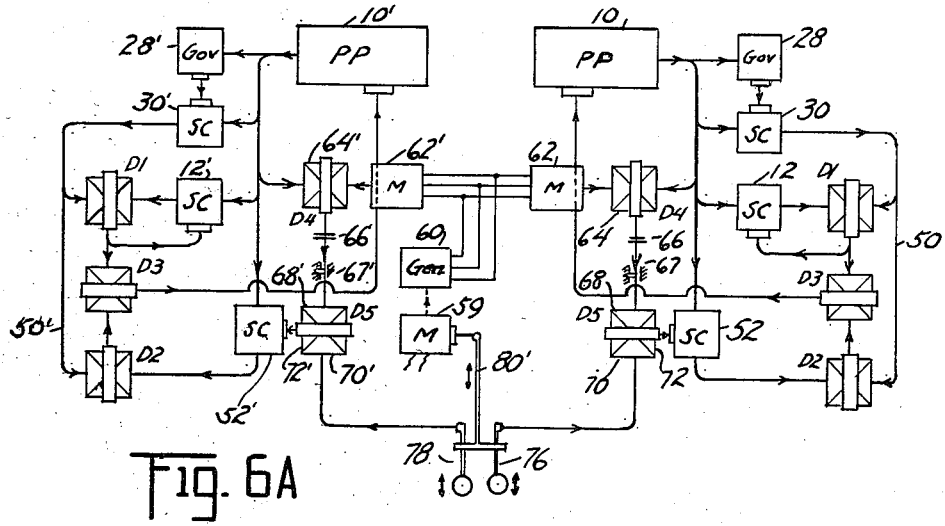
Fig. 6a is a diagram of the invention following the arrangement of Fig. 6 and showing an entire system.

Figs. 6 and 6a show a control system amplified from the disclosure of Fig. 5 wherein the system is adapted for synchronization with one or more additional power plants, utilizing a master reference speed source in the form of a polyphase generator 60. The differential assemblies D1, D2, and D3 have been omitted in Fig. 6 but are connected to the power plant and to the speed changers 30, 12 and 52, in the same manner as shown in Fig. 5.

The generator 60 drives a synchronous motor 62 at synchronous speed therewith, the motor 62 driving the left hand input of a differential D4. The power plant drives the right hand input of the differential D4. Any speed error between the power plant and the synchronous motor is reflected in rotation of the output element 64 of differential D4.

The output element 64 drives a slip clutch 66 which imposes speed error on an input element 68 of a differential D5. The input element is limited to a small range of rotation by a stop arrangement 67. The other input element 70 of differential D5 is normally fixed so that any motion in the input element 68 is transmitted to the output element 72 of the differential D5. This in turn is drivably connected to the speed changer 52 so that the output element 72 adjusts the speed changer 52 in response to speed errors between the power plant and the synchronous motor, to a value to produce a certain speed in the output of 52 from the speed of the power plant. If this certain speed varies from the output speed of speed changer 30, power plant speed correction will result until power plant speed is the same as synchronizer speed. This condition, through differential D4, holds the ratio of speed changer 52 at the proper value.

From here on, the system operates in the same manner as that described in connection with Figure 5. In Fig. 6a, substantially the same system is shown and the same reference characters are used predominantly. The right hand power plant and its controls use unprimed reference characters while the similar elements in the left hand power plant use prime reference characters. In Fig. 6a, a motor 59 is shown as driving the generator 60, the motor being of adjustable speed type.

The generator 60 may be used as the master speed reference for a plurality of power plants, the generator being connected to other synchronous motors, like motor 62, through leads 74.

When the synchronizing generator 60 is not operating, the input 68 of differential D5 would not be subject to torque from the clutch 66 and would remain stationary. A suitable centering spring, not shown, or a suitable resistance to rotation of the element 68, would be used to hold the element from rotation when the synchronizer is not operating. The stop assembly 67 limits angular motion of the input to the differential D5. Thereupon, adjustment for the speed level of the power plant may be afforded by a manual lever 76 which adjusts the differential input 70 and consequently the ratio of the speed changer 52. The control 76 is equivalent to the control 58 of Fig. 5 when the synchronizer is not operating. In Fig. 6a the adjustable speed motor 59 is adjusted by either the control lever 76 or 78 to establish the synchronous desired speed for both power plants.

Ordinarily, the controls for a plurality of aircraft power plants driving propellers are so connected that each power plant has its own individual power control, the power control coordinating on a fixed schedule, the desired power plant R. P. M. and the fuel input to the power plant. When plural power plants are used an interlock arrangement is provided between the several individual controls so that all power plants will be set to the speed of that power plant whose control lever is farthest advanced. The less advanced controls of other power plants will call for a lesser degree of fuel feed but all will be set to the R. P. M. level of the most advanced control. This obtains when the power plants are synchronized through the use of a generator such as 60. Other power plants, while operating at the most advanced speed, can be controlled as to power by setting their power levers to a low power position. This yields flexibility of operation.

In Figs. 6 and 6a, another power lever 78 for another power plant is shown with an operating link 80 setting the generator 60 to the desired R. P. M. level. In the case of Fig. 6a the link 80 controls the speed of the motor 59 which drives the generator 60. This controls the power plants 10 to synchronize speed. However, in Fig. 6 the control for power plant 10 is set back from the position for synchronous speed as represented by the distance 82. This means that the power plant 10 through the coordinated fuel control will be operating at less power, but at the same speed, as the power plant controlled by the lever 78. When the synchronizer is not in operation, or may have failed, the coordinated speed control, of course, drops out, but each power plant may be individually controlled for power and R. P. M. through actuation of the control levers and through operation of the differentials D5. In Fig. 6a either power lever 76 or 78, whichever is furthest advanced, controls the speed of operation of the motor 59. The functioning of the arrangement in Fig. 6a is the same as that shown in Fig. 6.

In the systems of Figs. 5, 6 and 6a, except for operation of the synchronizing generator 60, the governed speed of the power plant is derived from the power plant itself through the fixed setting governors 28 without the need for separate speed reference devices.

In the arrangement of Figs. 6 and 6a, the differential D4 and the clutch 66 provide a means for trimming the speed of the power plant to a precise desired level, in addition to providing a speed and acceleration responsive control of the driven load through the operation of the differentials D1, D2 and D3 and associated apparatus.

In the arrangement of Figs. 6 and 6a, the signal strength of the synchronizer part of the system may be low so as not to insert instability into the governing system. The synchronizer may be designed to require several seconds to trim the system to synchronism, whereas the governor system operates nearly instantaneously. This also avoids the causing of drastic power plant speed setting changes due to the synchronizer not operating. Limits may be placed on the rotation of element 68 as at 67 so that malfunction of the synchronizer cannot in effect a speed setting differing greatly from the setting represented by the level 78.

In any of the systems described, an advantage flows from reducing the load on the adjustable speed reference, enabling effective use of small size reference speed units.

Further arrangements of the invention, rather obvious in view of the preceding explanations, could be set up as follows:

(1) The elements 42, 24, 48, 46 and 34 of Fig. 4 could be disposed in Figs. 5 and 6 or 6a to replace the speed changer 52 and related mechanisms;

(2) The elements 52, 60, 62, D4 and D5 and auxiliaries, in Figs. 6 and 6a, could be used in the arrangement in Fig. 4, replacing the elements 42, 24, 46 and 34.

Figure 7:
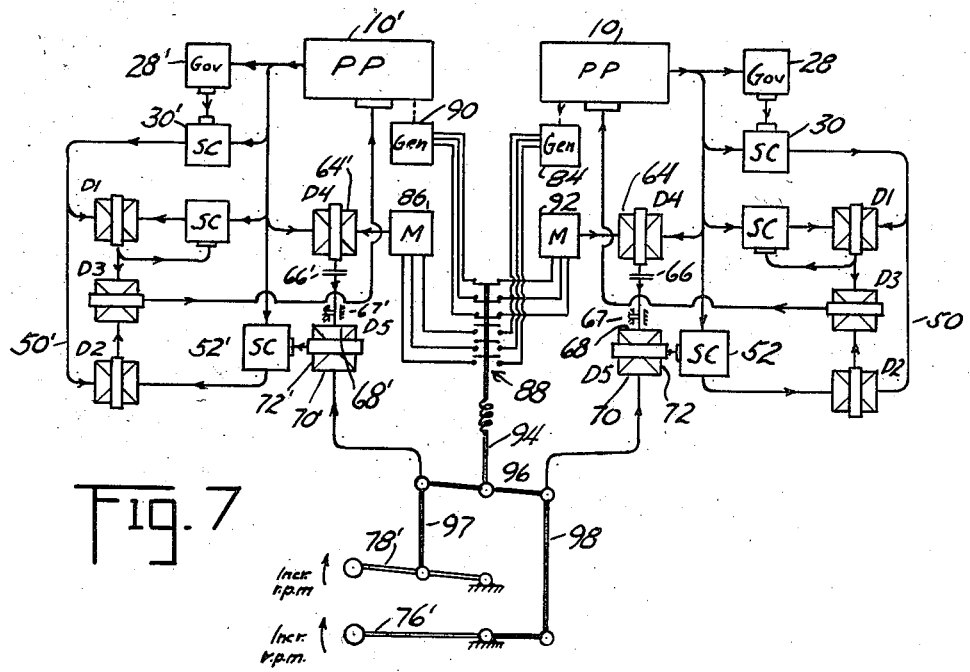
Fig. 7 is a diagram of an alternative embodiment of the invention adapted for synchronization of a plurality of power plants.

Fig. 7 shows a trimming synchronizer system which operates in generally similar fashion to that above described except that either the power plant 10 or 10' may act as the master speed reference, to which rotational speed of the other power plant is trimmed. Herein, power plant 10 drives a generator 84 which may be connected to drive a synchronous motor 86 through a switch 88, motor 86 driving the D4 differential 64'. In similar fashion, the power plant 10' drives the generator 90 which may be connected through the switch 88 to drive the synchronous motor 92 which in turn is connected to the D4 differential 64. The switch 88 is preferably of snap action type, connecting the generator 84 and the motor 86 or alternatively the generator 90 and the motor 92 by actuation of a switch member 94. The latter is pivotally connected to the middle of a rocker, the ends of the rocker being connected through links 97 and 98 to manually operable power levers 76' and 78'. As shown, the power lever 78' is advanced slightly ahead of the lever 76', thus throwing the switch 88 to connect the generator 90 with the motor 92. This establishes the power plant 10' as the master and the power plant 10 is slaved to synchronism with the power plant 10' through the trimming synchronizer mechanism embodying the differentials D4 and D5 in the control system of the power plant 10. In this situation R. P. M. control of the power plant 10' is accomplished by the setting of the power lever 78' acting upon the input gear 70' of the differential D5. This adjusts the speed changer 52' to set a desired level of speed for the power plant 10'.

If the power lever 76' is advanced to the position of the power lever 78', control remains in the power plant 10', but if the power lever 76' is advanced ahead of the lever 78', power plant 10 becomes the master for R. P. M. control and the power plant 10' is slaved thereto. This occurs because of the shift of the switch 88 which sets up the generator 84 to control the motor 86.

As in previous embodiments, should the master alternator or its power plant fail, slave power plants would shift to control by their own governors.

By appropriate mechanisms, the synchronizing trimming control of Figs. 6, 6a and 7 can be expanded to encompass more than two power plant and control systems.

Though several embodiments of the invention are shown, it is to be understood that the invention may be applied in other forms and in various environments. Changes may be made in the arrangements shown without departing from the spirit of the invention. Reference should be had to the appended claims for definition of the limits of the invention.

What is claimed is:

1. In a power plant speed control system, a variable ratio transmission driven by and connected to the power plant, a first differential having an input driven by the transmission output, said differential having a second input and an output, constant speed means driving the second input of said differential, a ratio changer in said transmission driven by said differential output, a second differential having an input driven by said power plant, an adjustable reference speed source driving another input of said second differential, a third differential having inputs driven by the outputs of said first and second differentials, and a power plant speed controller driven by the output of said third differential.

2. In a power plant speed control system, a constant speed source, an adjustable reference speed source, means connected to the power plant and reference speed source to compare power plant and reference speed productive of a speed error signal, means connected to said power plant and constant speed source to compare acceleration of the power plant against the constant speed source productive of a power plant acceleration signal, means connected to and driven by said two comparing means for summing said signals and productive of a combined speed error and acceleration signal, and means connected to said power plant and connected to and actuated by said summing means to change power plant speed.

3. A system according to claim 2, wherein said comparing means and said summing means each comprise a three-element differential having two input elements and an output element.

4. A system according to claim 2 wherein said constant speed source comprises a fixed-setting governor driven by the power plant and a speed changer driven by the power plant and including a ratio change element, and a control connection actuated by the governor and connected to control said ratio changer.

5. In a power plant speed control system, means to derive a fixed constant speed from the power plant regardless of its speed, means to derive from said first means a selectively variable reference speed, means to compare the power plant speed and the constant speed, means to compare power plant speed and the reference speed, summing means actuated by said last two means productive of a combined speed correction signal, and means actuated by said summing means and by said signal to control power plant speed.

6. In a power plant speed control system, a constant speed source, a speed changer driven by the power plant, comparing means driven by the speed changer and by the constant speed source having an acceleration signal output, said output being operatively connected to change the drive ratio of said speed changer, means to derive a function of said constant speed as a reference speed, means to compare said function speed and the speed of said power plant productive of a speed error output, summing means connected to said two comparing means and driven thereby productive of a combined error signal including speed error and acceleration factors, and means connected to said summing means to change power plant speed according to said combined error signal.

7. In a power plant speed control system, a constant speed source, a speed changer driven by the power plant, comparing means driven by the speed changer and by the constant speed source having an acceleration function output, said output being operatively connected to change the drive ratio of said speed changer; a reference speed source, comparing means driven by said reference speed source and by said power plant at a function of power plant speed and having a speed error output, and summing means connected to and driven by said two outputs, said summing means having an output operatively connected to change power plant speed.

References Cited in the file of this patent

UNITED STATES PATENTS

| | | |
|---|---|---|
| 1,520,973 | Staege | Dec. 30, 1924 |
| 2,000,049 | Taylor | May 7, 1935 |
| 2,248,072 | Fry | July 8, 1941 |
| 2,494,092 | Hayward | Jan. 10, 1950 |
| 2,595,195 | Hosterman | Apr. 29, 1952 |